United States Patent
Kim et al.

(10) Patent No.: US 11,887,444 B2
(45) Date of Patent: Jan. 30, 2024

(54) VENDING MACHINE CONTROL SYSTEM, CONTROL DEVICE AND CONTROL METHOD

(71) Applicant: Rakuten Group, Inc., Tokyo (JP)

(72) Inventors: Mijung Kim, Tokyo (JP); Jinling Chen, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 403 days.

(21) Appl. No.: 17/059,120

(22) PCT Filed: Mar. 16, 2020

(86) PCT No.: PCT/JP2020/011558
§ 371 (c)(1),
(2) Date: Nov. 25, 2020

(87) PCT Pub. No.: WO2021/186516
PCT Pub. Date: Sep. 23, 2021

(65) Prior Publication Data
US 2022/0058907 A1  Feb. 24, 2022

(51) Int. Cl.
*G07F 9/00* (2006.01)
*G06V 40/10* (2022.01)

(52) U.S. Cl.
CPC .............. *G07F 9/009* (2020.05); *G06V 40/10* (2022.01); *G07F 9/001* (2020.05)

(58) Field of Classification Search
CPC ......... G07F 9/026; G07F 9/009; G06Q 20/18; G06V 40/10; G06V 40/44
See application file for complete search history.

(56) References Cited

U.S. PATENT DOCUMENTS

| | | | | |
|---|---|---|---|---|
| 10,282,720 | B1 * | 5/2019 | Buibas | G06Q 20/40 |
| 11,100,745 | B2 * | 8/2021 | Yamato | G07F 17/14 |
| 2004/0245272 | A1 * | 12/2004 | Fitzgerald | G07F 17/18 |
| | | | | 221/90 |
| 2015/0347733 | A1 | 12/2015 | Tsou et al. | |
| 2016/0188962 | A1 | 6/2016 | Taguchi | |
| 2020/0273011 | A1 * | 8/2020 | Winsor | G07F 9/002 |
| 2021/0398188 | A1 * | 12/2021 | Jafa | G06Q 20/18 |

FOREIGN PATENT DOCUMENTS

| | | |
|---|---|---|
| JP | 2009-43176 A | 2/2009 |
| JP | 2011-150497 A | 8/2011 |
| JP | 2016-122272 A | 7/2016 |
| JP | 2017-117281 A | 6/2017 |
| JP | 6581751 B1 | 9/2019 |

OTHER PUBLICATIONS

International Search Report for PCT/JP2020/011558 dated May 19, 2020.

* cited by examiner

*Primary Examiner* — Timothy R Waggoner
(74) *Attorney, Agent, or Firm* — Sughrue Mion, PLLC

(57) ABSTRACT

When a vending machine control system S detects a user who is about to open a door 13 of a vending machine 1 while the door 13 is locked, the vending machine control system S determines whether the detected user has a payment capability on the basis of information for settlement of the detected user. And then, the vending machine control system S controls to unlock the door 13 of the vending machine 1 in a case that it is determined that the user has the payment capability.

7 Claims, 9 Drawing Sheets

FIG. 2
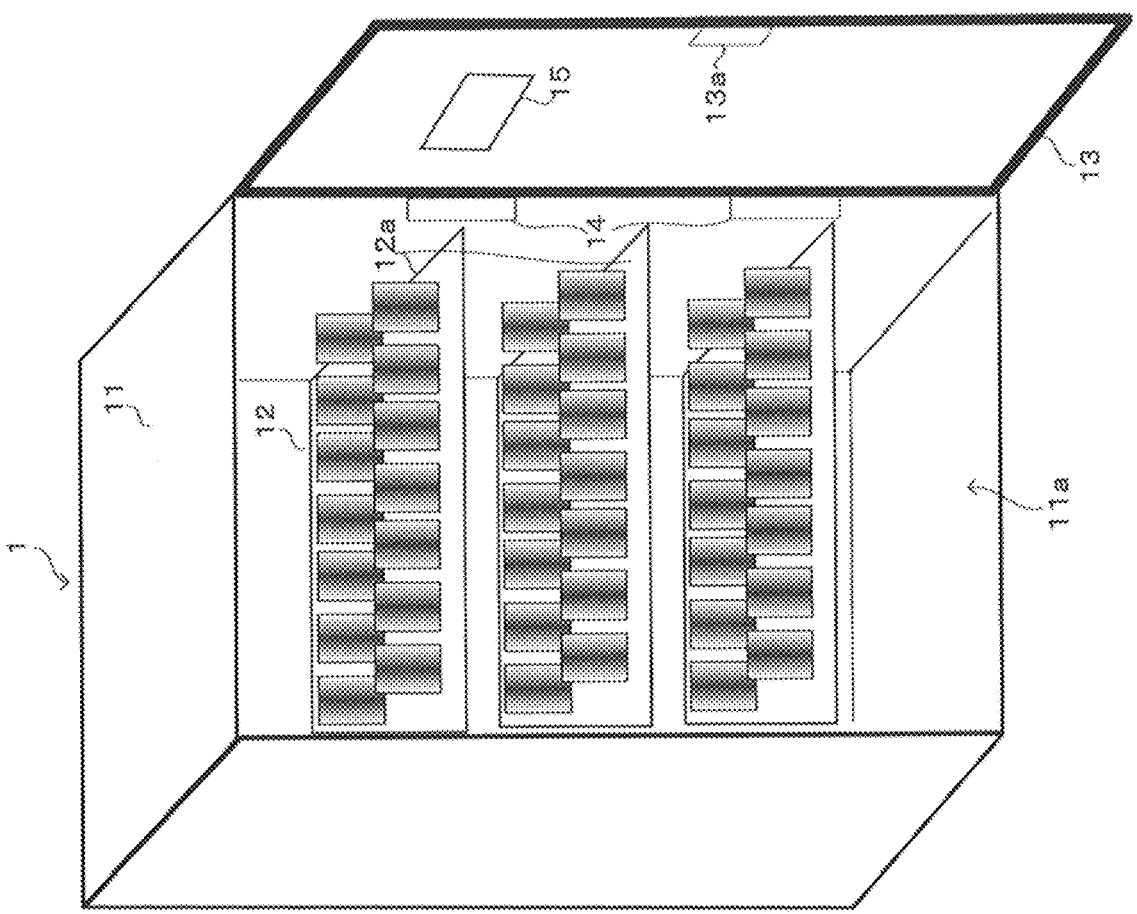
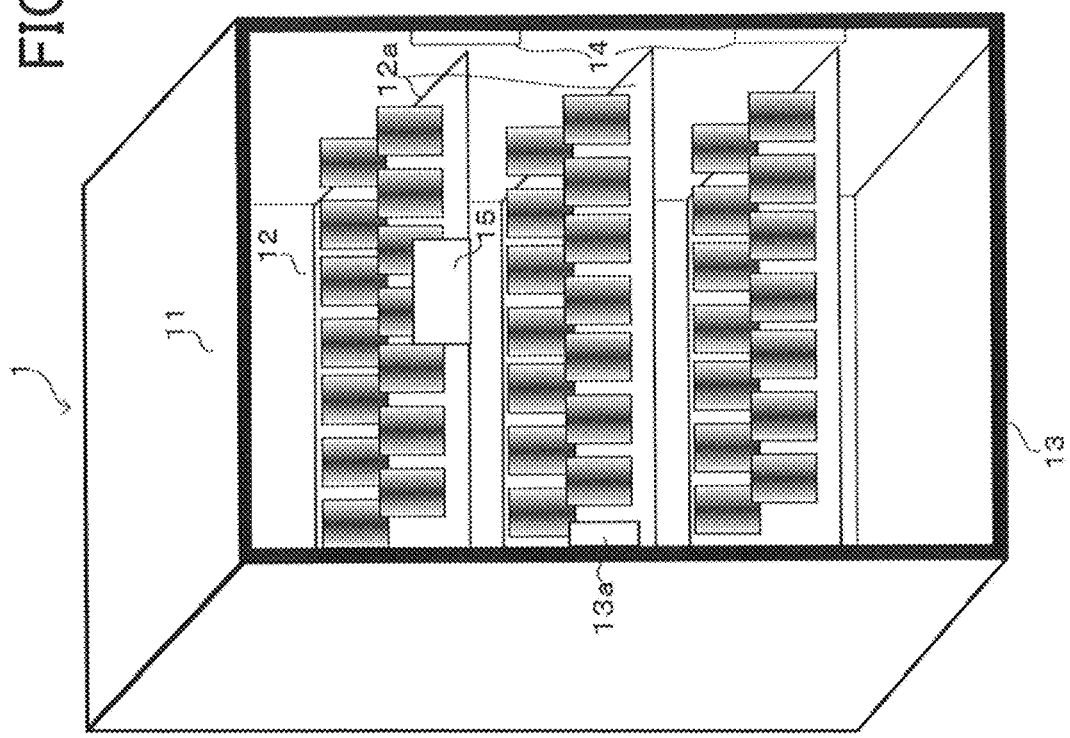

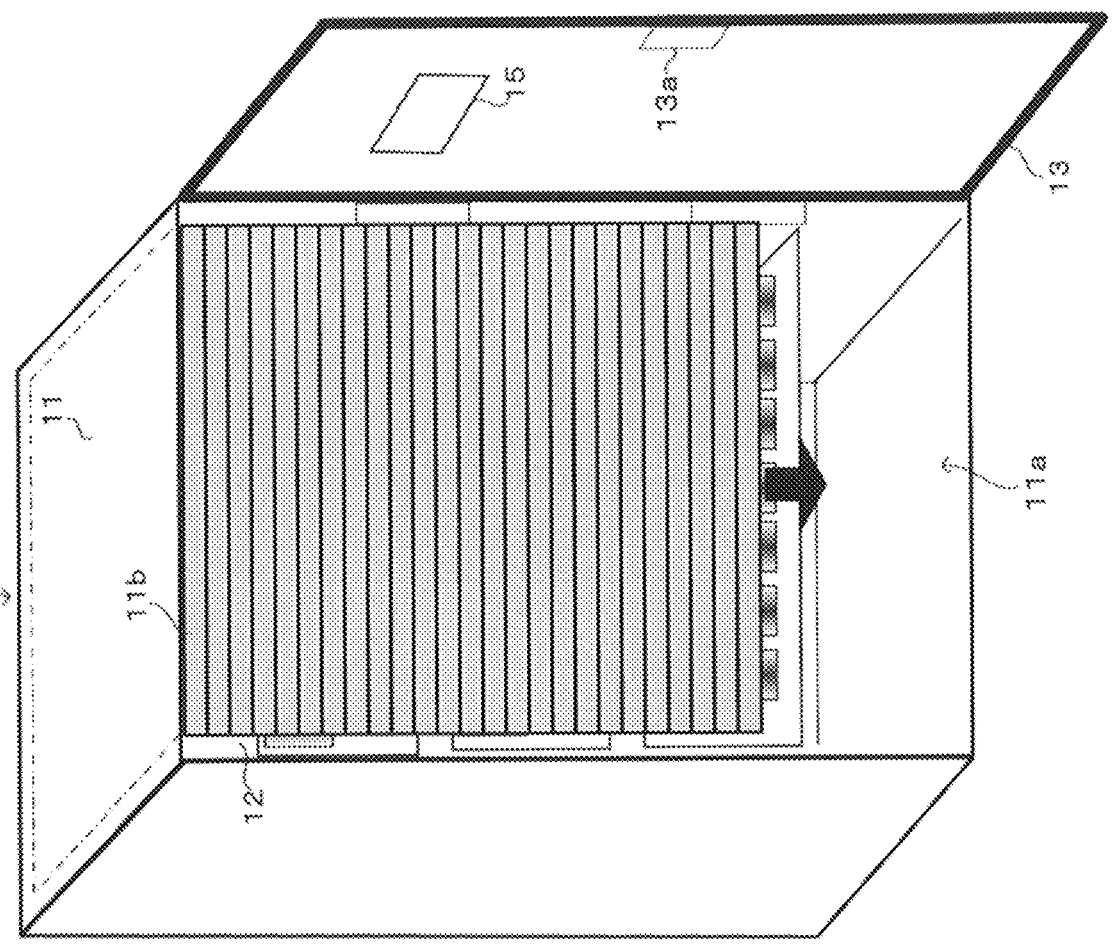

VENDING MACHINE CONTROL SYSTEM, CONTROL DEVICE AND CONTROL METHOD

CROSS REFERENCE TO RELATED APPLICATIONS

This application is a National Stage of International Application No. PCT/JP2020/011558 filed Mar. 16, 2020.

TECHNICAL FIELD

The present invention relates to a technical field such as a system configured to perform automatic settlement for a product picked up from a vending machine.

BACKGROUND ART

Conventionally, there is a system to perform automatic settlement for a product picked up from a vending machine by a user who has a mobile terminal. For example, a vending machine disclosed in Patent Literature 1 transmits a radio signal to a mobile terminal when the vending machine detects a user who has the mobile terminal within a predetermined range from the vending machine. And then, when the vending machine receives a connection request signal with an automatic debit flag (a flag indicating whether or not to use automatic debit for purchase of a product) from the mobile terminal receiving the radio signal, the vending machine pays out the product selected by the user (paragraph 0053).

CITATION LIST

Patent Literature

Patent Literature 1: JP 2017-117281 A

SUMMARY OF INVENTION

Technical Problem

However, in the technique of Patent Literature 1, since the technology of Patent 1 does not check a payment capability of the user who has the mobile terminal, the product may be picked out from the vending machine even though the user does not have the payment capability.

Therefore, one or more embodiments of the present invention are directed to provide a vending machine control system, a control device, and a control method that can improve convenience (user friendliness) of a vending machine and prevent a user who does not have payment capability from picking up a product from the vending machine.

Solution to Problem

In response to the above issue, the invention according to an aspect of the disclosure is a vending machine control system including: a detection unit configured to detect a user who is about to open a door of a vending machine when the door is in a locked state, the door covering an open space through which a product is picked up from a storing chamber of the vending machine; an acquisition unit configured to acquire information for settlement of the user detected by the detection unit; a determination unit configured to determine whether or not the user has a payment capability on the basis of the information for settlement acquired by the acquisition unit; and a first control unit configured to control to unlock the door if it is determined that the user has the payment capability. This makes it possible to improve convenience of the vending machine and prevent a user who does not have payment capability from picking up a product from the vending machine.

The invention according to an aspect of the disclosure is the vending machine control system further including: a distance identification unit configured to identify a distance between the vending machine and the user; and an orientation detection unit configured to detect an orientation of the user's body to the vending machine, wherein the detection unit detects, as the user who is about to open the door, a user whose the distance identified by the distance identification unit is equal to or less than a predetermined distance and whose the orientation detected by the orientation detection unit satisfies a predetermined condition. This makes it possible to accurately defect a user who is about to open the door of the vending machine.

The invention according to an aspect of the disclosure is the vending machine control system further including: a distance identification unit configured to identify a distance between the vending machine and the user; and a sight line estimation unit configured to estimate the user's sight line to the vending machine, wherein the detection unit detects, as the user who is about to open the door, a user whose the distance identified by the distance identification unit is equal to or less than a predetermined distance and whose the sight line estimated by the sight line estimation unit satisfies a predetermined condition. This makes it possible to accurately defect a user who is about to open the door of the vending machine.

The invention according to an aspect of the disclosure is the vending machine control system, wherein the detection unit detects, as the user who is about to open the door, a user corresponding to biometric information acquired by a sensor attached to the door. This makes it possible to accurately defect a user who is about to open the door of the vending machine.

The invention according to an aspect of the disclosure is the vending machine control system, wherein the information for settlement includes a balance of settlement means owned by the user, and the determination unit determines that the user has the payment capability in a case that the balance is equal to or higher than a predetermined price. This makes it possible to ensure that the user pays an amount equivalent to sales price of the product.

The invention according to an aspect of the disclosure is the vending machine control system further including: a product identification unit configured to identify the product picked up through the open space from the storing chamber by the user after the door is opened; and a settlement processing unit configured to perform, on the basis of the information for settlement acquired by the acquisition unit, a settlement process for the product identified by the product identification unit, in a case that the door is closed after the product is identified. This makes it possible to safely complete the settlement process.

The invention according to an aspect of the disclosure is the vending machine control system further including: a second control unit configured to control to prevent the product from being picked up from the storing chamber, in a case that a state in which the door is opened remains for a predetermined period of time or longer. This makes it possible not only to safely complete the settlement process but also to prevent a third party from removing the product from the storing chamber even in a case that the user has left without remembering to close the door of the vending machine.

The invention according to an aspect of the disclosure is a control device including: a detection unit configured to detect a user who is about to open a door of a vending machine when the door is in a locked state, the door covering an open space through which a product is picked up from a storing chamber of the vending machine; an acquisition unit configured to acquire information for settlement of the user detected by the detection unit; a determination unit configured to determine whether or not the user has a payment capability on the basis of the information for settlement acquired by the acquisition unit; and a first control unit configured to control to unlock the door if it is determined that the user has the payment capability.

The invention according to an aspect of the disclosure is a control method executed by one or more computers, the control method including: a step of detecting a user who is about to open a door of a vending machine when the door is in a locked state, the door covering an open space through which a product is picked up from a storing chamber of the vending machine; a step of acquiring information for settlement of the detected user; a step of determining whether or not the user has a payment capability on the basis of the acquired information for settlement; and a step of controlling to unlock the door if it is determined that the user has the payment capability.

Advantageous Effect of the Invention

According to the present invention, it is possible to improve convenience of the vending machine and prevent a user who does not have payment capability from picking up a product from the vending machine.

BRIEF DESCRIPTION OF DRAWINGS

FIG. 2 illustrates external perspective views of a vending machine 1.

FIG. 9 is an external perspective view of the vending machine 1 that includes an inner door 13b provided between a storing chamber 12 and a door 13.

DESCRIPTION OF EMBODIMENTS

A vending machine control system according to an embodiment of the present invention will be described in detail below with reference to the drawings.
[1. Schematic Configuration and Schematic Function of Vending Machine Control System S]

Figure 1:
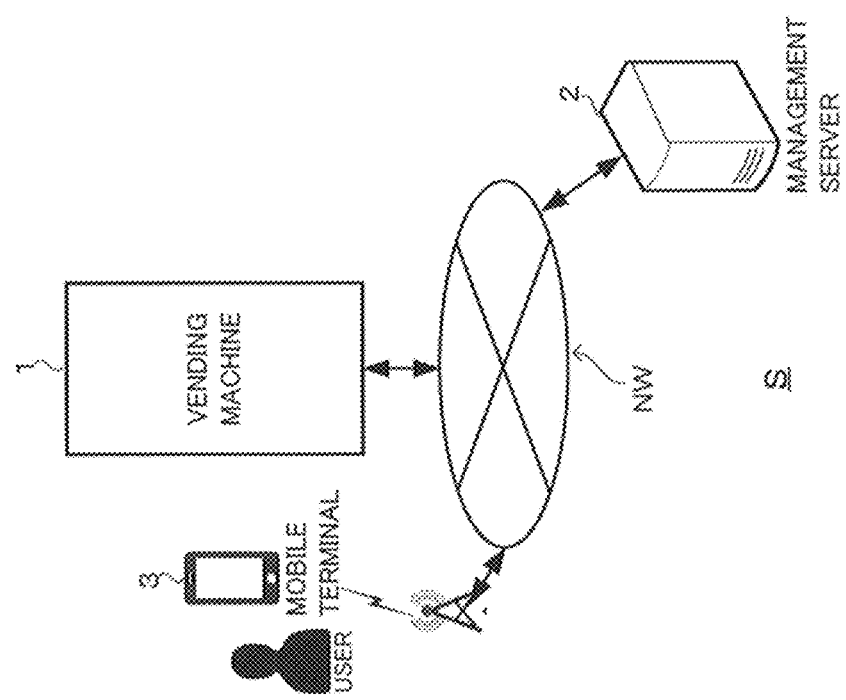
FIG. 1 is a diagram illustrating a schematic configuration example of a vending machine control system S according to this embodiment.

First, a schematic configuration and a schematic function of a vending machine control system S according to this embodiment will be described with reference to FIG. 1 and others. FIG. 1 is a diagram illustrating a schematic configuration example of the vending machine control system S according to this embodiment. As illustrated in FIG. 1, the vending machine control system S includes a vending machine 1, a management server 2, and a mobile terminal 3. Incidentally, the vending machine 1 or the management server 2 functions as a control device. The vending machine 1 and the mobile terminal 3 can respectively communicate with the management server 2 via a communication network NW. The communication network NW may be composed of, for example, a leased line, the internet, a mobile communication network, or the like.

Moreover, the mobile terminal 3 has a GPS (Global Positioning System) function and a near-field communication function. The GPS function is a function of acquiring position information (latitude and longitude) of the mobile terminal 3 by using radio waves transmitted from GPS satellites or GNSS (Global Navigation Satellite System) satellites. The near-field communication function is, for example, a short-range wireless communication function based on the Wi-Fi (registered trademark) or Bluetooth (registered trademark) standard. The vending machine 1 is capable of performing the short-range wireless communication with the mobile terminal 3. The mobile terminal 3 stores a user's UID. The mobile terminal 3 is, for example, a smartphone, a mobile phone, a tablet, a mobile game machine, or the like.

Incidentally, although an installation place of the vending machine 1 is not particularly limited, it is installed, for example, in a building where people can enter and exit. In the example of FIG. 1, the vending machine 1 is illustrated as a single vending machine. Alternatively, the vending machine 1 may be in plural, each provided at a different location. Moreover, the management server 2 manages and controls the vending machine 1. In addition, the management server 2 manages an account of the user, performs an authentication process for the user, and performs a settlement process for the product. The management server 2 may be a single server or may be constituted by a plurality of servers. Moreover, the management server 2 may be divided into two servers: one manages and controls the vending machine 1, while the other manages the account of the user, performs the authentication process for the user, and performs the settlement process for the product.

FIG. 2 illustrates external perspective views of the vending machine 1. As illustrated in FIG. 2, the vending machine 1 includes a main body 11, a storing chamber 12, a door 13, a hinge mechanism (not illustrated), a lock/unlock mechanism (not illustrated), a door drive mechanism 14, and a display 15. The main body 11 includes an open space 11a in front; the storing chamber 12 stores products; the door 13 covers an open space 11a through which a product is picked up from the storing chamber 12; the hinge mechanism connects the main body 11 with the door 13; the lock/unlock mechanism locks and/or unlocks the door 13; and the door drive mechanism 14 automatically closes the door 13 (and includes a motor (not illustrated) or the like). Incidentally, the storing chamber 12 is provided in the main body 11. When the door 13 is closed (i.e., open space 11a is covered by the door 13), the user may not pick up the product from the storing chamber 12.

The door 13 is formed of, for example, a transparent glass material, and thus the user can see each product displayed on a shelf 12a in the storing chamber 12 even when the door 13 is closed. The door 13 is mounted to an end edge of the open space 11*a* of the main body 11 with the hinge mechanism so as to be opened or closed. Moreover, when the door 13 is locked by the lock/unlock mechanism (i.e., when the door 13 is in a locked state), the user may not open the door 13. On the other hand, when the door 13 is unlocked, the user may operate a handle 13*a* provided on the door 13 to open the door 13, as illustrated on the right of FIG. 2. The display 15 is mounted, for example, on an inner surface (e.g., a glass surface) of the door 13 of the vending machine 1. The display 15 is configured to display a name, a sales price, and others of the product picked up by the user from the storing chamber 12.

Figure 3:
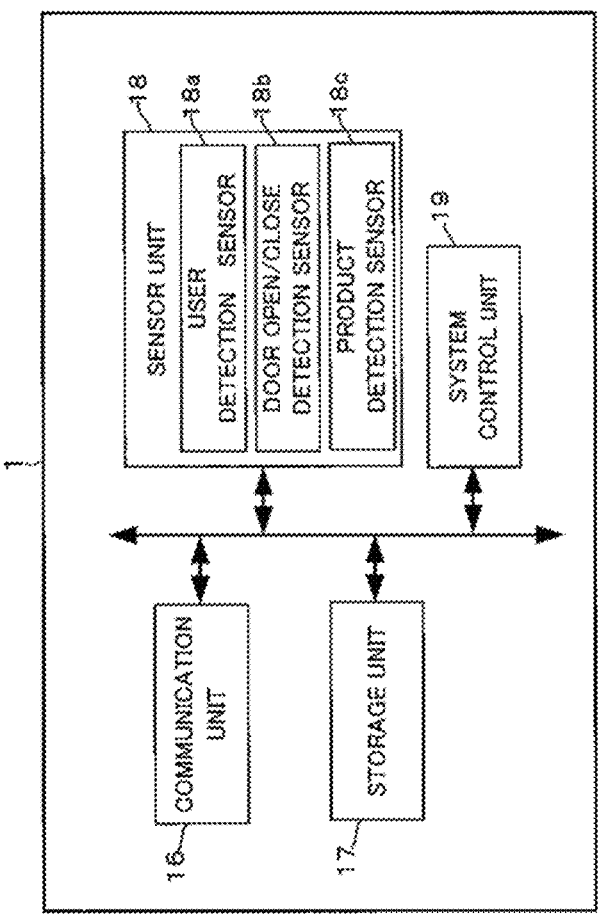
FIG. 3 is a diagram illustrating a functional configuration example of the vending machine 1.

FIG. 3 is a diagram illustrating a functional configuration example of the vending machine 1. As illustrated in FIG. 3, the vending machine 1 includes a communication unit 16, a storage unit 17, a sensor unit 18, and a system control unit 19. The communication unit 16 is configured to control communication performed via the communication network NW, and to control the near-field communication performed with the mobile terminal 3. The storage unit 17 may be, for example, a hard disk drive, and stores a vending machine processing program or the like. Moreover, the storage unit 17 stores product information of each product stored in the storing chamber 12. The product information includes, for example, information such as a product ID (product identification information), the name, the sales price, a weight, and a photographic image of the product. Furthermore, the storage unit 17 stores a vending machine ID (identification information of the vending machine 1) of the vending machine 1. The sensor unit 18 includes a user detection sensor 18*a*, a door open/close detection sensor 18*b*, a product detection sensor 18*c*, and the like.

The user detection sensor 18*a* is a sensor for detecting a user who is about to open the door 13 of the vending machine 1. The user detection sensor 18*a* may preferably be a camera (e.g., a 3D camera). Particularly, when the user detection sensor 18*a* is the 3D camera, it is possible to track the user as a subject and measure a distance to the user (measure the distance based on, for example, a time-of-flight (TOF) method). The user detection sensor 18*a* is mounted in the vicinity of the open space 11*a* of the main body 11. The user detection sensor 18*a* outputs, to the system control unit 19, image data in a range whose image is continuously captured by the camera (a range in a direction that the user moves away from the open space 11*a* of the vending machine 1). When the 3D camera is used, the image data includes distance information measured per pixel of the image data. Incidentally, the user detection sensor 18*a* may include a distance-measuring sensor such as LADAR (Laser Detection and Ranging).

As another example, the user detection sensor 18*a* may be a sensor capable of acquiring biometric information of a user. The biometric information is information indicating a feature quantity of fingerprints, palm prints, veins, or iris. For example, when the user detection sensor 18*a* is a fingerprint sensor, the fingerprint sensor is mounted to the handle 13*a* of the door 13 so that fingerprints can be obtained. Moreover, when the user detection sensor 18*a* is an iris sensor, the iris sensor is mounted on the inner surface (e.g., the glass surface or the display 15) of the door 13 so that the iris can be acquired. The user detection sensor 18*a* outputs the biometric information obtained to the extent that a person can be identified to the system control unit 19.

The door open/close detection sensor 18*b* is a sensor for detecting opening/closing of the door 13 of the vending machine 1. The door open/close detection sensor 18*b* is mounted to, for example, a border between the main body 11 and the door 13. The door open/close detection sensor 18*b* outputs an open signal (ON signal) to the system control unit 19 when the door 13 is open (an open state), while outputting a close signal (OFF signal) to the system control unit 19 when the door 13 is closed (a closed state). This configuration enables the system control unit 19 to detect the opening/closing of the door 13 of the vending machine 1. Incidentally, the door open/close detection sensor 18*b* may be a temperature sensor for measuring a temperature of the storing chamber 12. In this case, the door open/close detection sensor 18*b* outputs temperature data indicating the temperature measured to the system control unit 19.

The product detection sensor 18*c* is a sensor for detecting the product picked up (taken out) from the storing chamber 12 of the vending machine 1, or detecting the product returned to the storing chamber 12 after being picked up from the storing chamber 12. The product detection sensor 18*c* may be a camera or a weight sensor. When the product detection sensor 18*c* is the camera, the product detection sensor 18*c* is mounted in a vicinity of the open space 11*a* in the main body 11. In this case, the product detection sensor 18*c* outputs, to the system control unit 19, image data of a range continuously captured by the camera. This range is a range in which the open space 11*a* and the storing chamber 12 of the vending machine 1 fit. By this configuration, based on the image data, the system control unit 19 can detect the product picked up or the product returned after being picked up.

Alternatively, when the product detection sensor 18*c* is the weight sensor, the product detection sensor 18*c* is mounted in a location (the shelf 12*a* of the storing chamber 12 in the example of FIG. 2) where the products are placed inside the storing chamber 12. In this case, the product detection sensor 18*c* outputs weight data continuously detected by the weight sensor to the system control unit 19. By this configuration, based on the weight data, the system control unit 19 can detect the product picked up or the product returned after being picked up.

Figure 4:
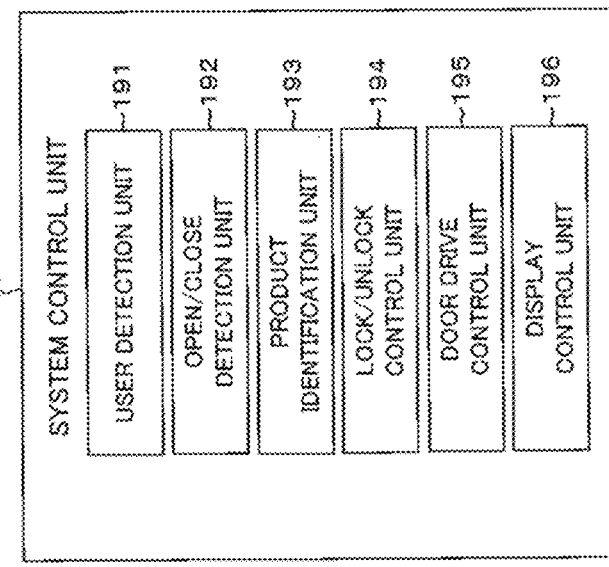
FIG. 4 is a diagram illustrating a functional configuration example of a system control unit 19.

The system control unit 19 (an example of a computer) includes a CPU (Central Processing Unit), a ROM (Read Only Memory), a RAM (Random Access Memory), and others. FIG. 4 is a diagram illustrating a functional configuration example of the system control unit 19. The system control unit 19 (at least one processor in the system control unit 19) executes, for example, the vending machine processing program stored in the storage unit 17 to function as illustrated in FIG. 4, that is, to function as a user detection unit 191, an open/close detection unit 192, a product identification unit 193, a lock/unlock control unit 194, a door drive control unit 195, and a display control unit 196. Here, the user detection unit 191 is an example of a detection unit, a distance identification unit, an orientation detection unit, and a sight line estimation unit. The open/close detection unit 192 is an example of a first control unit. The door drive control unit 195 is an example of a second control unit.

The user detection unit 191 detects a user who is about to open the door 13 when the door 13 of the vending machine 1 is in a locked state. Incidentally, at this stage, it is not determined who is trying to open the door 13, thus, this means that a situation in which someone is about to open the door 13 is detected. Here, a phrase "is about to open the door 13" means, in other words, that it is expected (estimated) that the user is about to open the door 13 (i.e., the user intends to open the door 13). A user who passes by the vending machine 1 does not fall into the user who about to open the door 13.

The following two detection methods can be mentioned as an example of a method for detecting a user who is about to open the door 13. As a first detection method for detecting the user who is about to open the door 13, the user detection unit 191 detects, on the basis of image data or the like input from the user detection sensor 18a, a user whose a distance between the vending machine 1 and the user is equal to or less than a predetermined distance (e.g., 50 cm) and the user whose an orientation of the user's body to the vending machine 1 satisfies (meets) a predetermined condition. Alternatively, as the first detection method, the user detection unit 191 detects, on the basis of image data or the like input from the user detection sensor 18a, a user whose a distance between the vending machine 1 and the user is equal to or less than a predetermined distance (e.g., 50 cm) and the user whose the user's sight line to the vending machine 1 satisfies a predetermined condition. As a second detection method, the user detection unit 191 may detect a user corresponding to the biometric information input from the user detection sensor 18a as the user who is about to open the door 13. This biometric information is biometric information acquired to the extent that a person can be identified. By either of the first and second detection methods, the user who is about to open the door 13 can be accurately detected. For example, when the user detection sensor 18a is a fingerprint sensor, the user who is about to open the door 13, can be accurately detected by the user touching the handle 13a of the door 13.

In the case of the first detection method, the user detection unit 191 may calculate and identify a distance between the vending machine 1 and the user from the location information of the vending machine 1 (latitude and longitude) and the location information of the mobile terminal 3 possessed by the user (latitude and longitude). In this case, the position information of the vending machine 1 is stored in advance in the storage unit 17. The position information of the mobile terminal 3 is acquired by the GPS function of the mobile terminal 3. The position information acquired by the GPS function may be corrected by a known method such as the RTK (Real Time Kinematic) method in which position information data from a reference station is used. Then, the position information of the mobile terminal 3 is transmitted from the mobile terminal 3 to the vending machine 1 by the short-range wireless communication. At this time, the UID of the user of the mobile terminal 3 may be transmitted to the vending machine 1 along with the position information of the mobile terminal 3. Alternatively, when the user detection sensor 18a is a 3D camera, the distance between the vending machine 1 and the user may be identified on the basis of the image data (including the distance information) input from the 3D camera. Alternatively, the distance between the vending machine 1 and the user may be measured by a distance measuring sensor such as LADAR.

Further, in the case of the first detection method, the user detection unit 191 extracts the user's body on the basis of the image data input from the user detection sensor 18a, and detects the orientation of the extracted body. For example, a direction in which the user's face is facing is detected (for example, detected from positional relationship between the user's eyes, nose, and mouth). At this time, a direction in which the user's chest is facing may be detected (in other words, the user's posture is detected) along with the user's face or instead of the face. Then, when the user's face is facing the vending machine 1 (that is, the direction of the door 13), the user detection unit 191 determines that the orientation of the user's body satisfies the predetermined condition. By this configuration, even if a user is close to the vending machine 1 (e.g., the distance between the vending machine 1 and the user is 50 cm or less), the user who passes by the vending machine 1 without intending to purchase the product can be excluded from the detection target.

Incidentally, the user detection unit 191 may determine that the orientation of the user's body satisfies the predetermined condition when the user's chest is facing the vending machine 1. By this configuration, even if the user is approaching the vending machine 1 and is temporarily turning sideways (that is, not facing the door 13) to talk with another person, it is possible to accurately detect the user who is about to open the door 13.

Alternatively, the user detection unit 191 estimates the user's sight line on the basis of the image data input from the user detection sensor 18a. Then, the user detection unit 191 determines that the user's sight line satisfies the predetermined conditions when the user's sight line is facing the vending machine 1 (i.e., when the user is looking into the vending machine 1). By this configuration, even if a user is close to the vending machine 1, the user who passes by the vending machine 1 without intending to purchase the product can be excluded from the detection target.

Incidentally, when the user who is about to open the door 13 is detected by the user detection unit 191, an authentication request is transmitted to the management server 2. The authentication request includes user identification information for identifying (in other words, authenticating) the user who is about to open the door 13 and the vending machine ID of the vending machine 1. In the case of the first detection method, the user identification information includes the image data used to detect the user who is about to open the door 13, or the UID acquired from the mobile terminal 3 by the short-range wireless communication when detecting the user who is about to open the door 13. In the case of the second detection method, the user identification information includes the biometric information used to detect the user who is about to open the door 13, or the UID acquired from the mobile terminal 3 by the short-range wireless communication when detecting the user who is about to open the door 13.

The open/close detection unit 192 detects the opening (the open state) of the door 13 of the vending machine 1 based on the open signal input from the door open/close detection sensor 18b. Here, the open state of the door 13 may be detected when the open signal remains on for a predetermined period of time or longer (when a duration of the open signal is longer than the predetermined period). Moreover, the open/close detection unit 192 detects the closing (the closed state) of the door 13 of the vending machine 1 based on the close signal input from the door open/close detection sensor 18b. Here, the closed state of the door 13 may be detected when the close signal remains on for a predetermined period of time or longer (when a duration of the close signal is longer than the predetermined period).

Alternatively, the open/close detection unit 192 may detect the opening/closing of the door 13 of the vending machine 1 on the basis of temperature data input from the door open/close detection sensor 18b. For example, the open/close detection unit 192 detects the closing of the door 13 of the vending machine 1 when the temperature data indicates a temperature below a threshold value, and detects the opening of the door 13 of the vending machine 1 when the temperature data indicates a temperature above the threshold value. Incidentally, door opening information indicating the opening detected by the open/close detection unit 192, is transmitted to the management server 2 via the communication network NW. Moreover, door closing information indicating the closing detected by the open/close detection unit 192, is transmitted to the management server 2 via the communication network NW.

On the basis of the image data input from the product detection sensor 18c, the product identification unit 193 detects the product picked up by the user from the storing chamber 12 after the opening of the door 13 is detected or detects the product returned to the storing chamber 12 after being picked up from the storing chamber 12, and identifies the product by image recognition. Here, machine learning (AI) may preferably be employed for the image recognition. In this case, the product identification unit 193 identifies the product from the image data input from the product detection sensor 18c by using a learning model in which features of image data are learned for each label on the basis of a combination of a large number of image data and labels (information indicating what the image data represents).

Alternatively, on the basis of the weight data input from the product detection sensor 18c, the product identification unit 193 may detect the product picked up from the storing chamber 12 or the product returned to the storing chamber 12 after being picked up from the storing chamber 12, and identify the product from a change in the weight. In this case, the product identification unit 193 previously stores arrangement information on where each product is located on the shelf 12a (i.e., information indicating which of the products is in which position). The product identification unit 193 detects, by referring the arrangement information, the product positioned in a location where the weight has changed on the shelf 12a on the basis of the weight data to identify the product picked up or the product returned after being picked up. Incidentally, product information indicating the product (the product picked up or the product returned after being picked up) identified by the product identification unit 193, is transmitted to the management server 2 via the communication network NW.

The lock/unlock control unit 194 controls to lock/unlock the door 13. For example, when receiving an unlock command from the management server 2, the lock/unlock control unit 194 controls to unlock the door 13 by outputting an unlock control signal to the lock/unlock mechanism. On the other hand, when receiving a lock command from the management server 2, the lock/unlock control unit 194 controls to lock the door 13 by outputting a lock control signal to the lock/unlock mechanism. Moreover, the door drive control unit 195 controls to prevent any of the products from being picked up from the storing chamber 12. The door drive control unit 195 controls the door 13 to prevent the product from being picked up from the storing chamber 12 of the vending machine 1 when the door 13 has been opened for a predetermined time or longer. For example, the door drive control unit 195 controls the door 13 to automatically close the door 13 by outputting a close control signal to the door drive mechanism 14 when the door 13 has been opened for a predetermined time or longer. By this configuration, it is possible not only to safely complete the settlement process but also to prevent a third party from removing the product from the storing chamber 12 even in a case that the user has left without remembering to close the door 13.

When the product identification unit 193 identifies the product picked up from the storing chamber 12, the display control unit 196 displays the name, the sales price, and the like of the identified product on the display 15. This configuration enables the user to confirm the name, the sales price, and the like of the product that the user has picked up from the storing chamber 12 before closing the door 13 to proceed to the settlement for the product. Moreover, when the product identification unit 193 identifies the product returned to the storing chamber 12 after being picked up from the storing chamber 12, the display control unit 196 deletes the name, the sales price, and the like of the product identified from the display 15.

Figure 5:
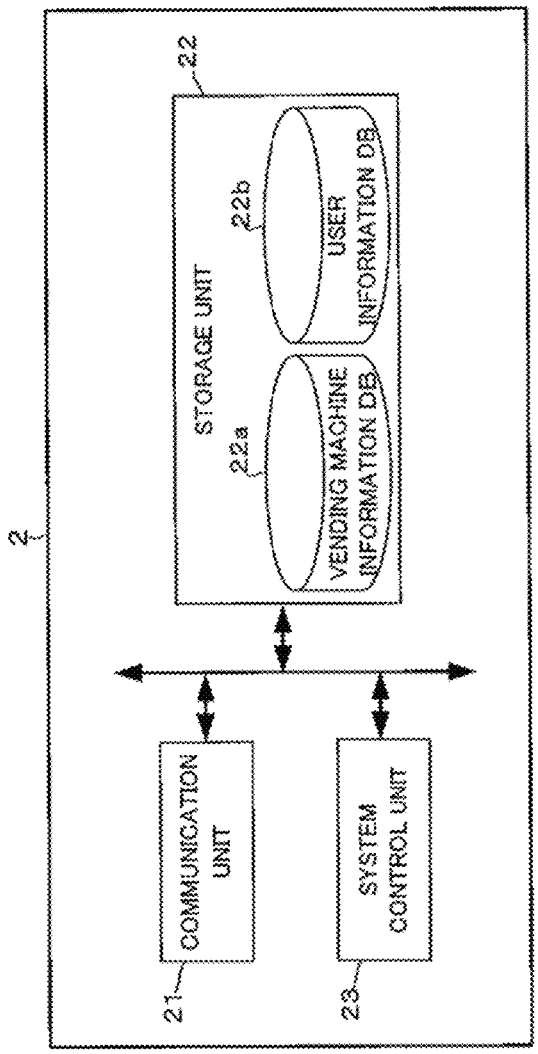
FIG. 5 is a diagram illustrating a functional configuration example of a management server 2.

FIG. 5 is a diagram illustrating a functional configuration example of the management server 2. As illustrated in FIG. 5, the management server 2 includes a communication unit 21, a storage unit 22, and a system control unit 23. The communication unit 21 is configured to control communication performed via the communication network NW. The communication unit 21 receives the user identification information, the door opening information, the door closing information, the product information, and the like transmitted from the vending machine 1. The storage unit 22 is, for example, a hard disk drive, and stores a management server program or the like. Moreover, in the storage unit 22, a vending machine information database (DB) 22a, a user information database (DB) 22b, and the like are constructed.

The vending machine information database 22a stores the vending machine ID of the vending machine 1, the product information of each product (i.e., the product that can be picked up from the vending machine 1) stored in the vending machine 1, an IP address of the vending machine 1, and the like, all of which are stored in correspondence to each of the vending machines 1. The user information database 22b stores a UID, a password, a name, a phone number, an e-mail address, registered biometric information, information for settlement, and the like, all of which are stored in correspondence to each of the users having an account. Here, the UID of the user is used for the authentication process (e.g., ID authentication) for the user. The registered biometric information is information indicating a feature quantity of a face, fingerprints, palm prints, veins, or iris previously obtained from each user. The registered biometric information is used for the authentication process (e.g., biometric authentication such as face authentication, fingerprints authentication, palm prints authentication, veins authentication, or iris authentication) for the user. Incidentally, when the ID authentication is performed in the authentication process, the registered biometric information may not be stored in the user information database 22b.

The information for settlement is used for the settlement process for the product to be purchased by the user. The information for settlement includes information corresponding to a settlement method available to the user. The information for settlement includes information according to the settlement method specified in advance by the user. The settlement method available includes, for example, an electronic money settlement, a direct debit settlement, a point settlement, a credit settlement (credit card settlement), an UID settlement (e.g., a smartphone settlement), and the like. When the settlement method available is the electronic money settlement, the information for settlement includes information such as an electronic money card number, the balance of an electronic value (an example of settlement means owned by the user), and the like. When the settlement method available is the direct debit settlement, the information for settlement includes a debit card number, a name, an expiry date, the balance of a deposit (an example of settlement means owned by the user) and the like, along with account information. When the settlement method available is the point settlement, the information for settlement includes information such as a point card number and the balance of points (an example of settlement means owned by the user). Here, the point is something that has the same monetary value as money (currency) or electronic money.

When the settlement method available is the credit settlement, the information for settlement includes a credit card number, a name, an expiry date, a credit limit (credit line), an amount available for use (a balance of the credit limit from which an amount used in the month is deducted), and the like, along with account information. When the settlement method available is the UID settlement, the information for settlement includes information on the settlement method (e.g., the electronic money settlement, the direct debit settlement, the credit settlement) linked as the settlement source (e.g., the electronic money card number, the debit card number, the credit card number) and the maximum amount. Incidentally, the information for settlement of the user may be controlled and managed by a server (e.g., an electronic money settlement processing server, a direct debit settlement processing server, a point settlement processing server, a credit settlement processing server, or the like) according to the settlement method. In this case, the management server 2 communicates with the server according to the settlement method as needed, and acquires the information for settlement of the user.

Figure 6:
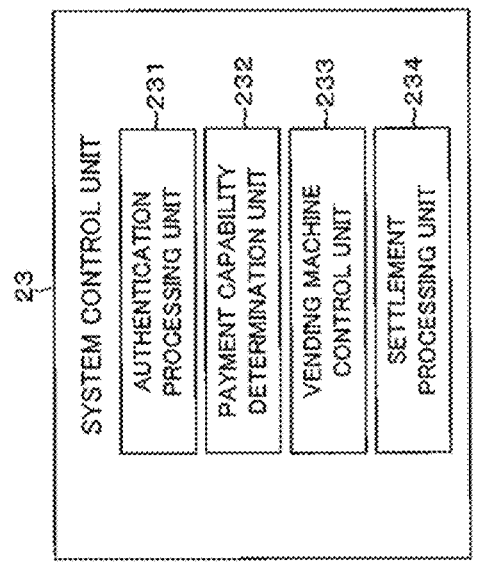
FIG. 6 is a diagram illustrating a functional configuration example of a system control unit 23.

The system control unit 23 (an example of the computer) includes a CPU, a ROM, a RAM, and others. FIG. 6 is a diagram illustrating a functional configuration example of the system control unit 23. Incidentally, the system control unit 23 recognizes a situation in which the user is about to open the door 13 on the basis of the user identification information received from the vending machine 1. Moreover, the system control unit 23 recognizes the opening/closing of the door 13 on the basis of the door opening information or the door closing information received from the vending machine 1. Moreover, the system control unit 23 recognizes the product picked up from the storing chamber 12 or the product returned to the storing chamber 12 on the basis of the product information received from the vending machine 1.

Further, the system control unit 23 (at least one processor in the system control unit 23) executes, for example, the management server program stored in the storage unit 22 to function as illustrated in FIG. 6, that is, to function as an authentication processing unit 231, a payment capability determination 232, a vending machine control unit 233, and a settlement processing unit 234. Here, the payment capability determination 232 corresponds to an example of an acquisition unit and a determination unit. The vending machine control unit 233 controls to lock/unlock the door 13 in cooperation with the lock/unlock control unit 194 of the vending machine 1, and controls to prevent the products from being picked up in cooperation with the door drive control unit 195 of the vending machine 1.

When an authentication request is received from the vending machine 1 while the door 13 is locked, the authentication processing unit 231 performs an authentication process for a user (i.e., the user who is about to open the door 13) detected by the user detection unit 191 of the vending machine 1. Here, in the authentication process of the case where the UID is included as the user identification information in the authentication request, it is determined whether or not the UID included in the authentication request is stored (registered) in the user information database 22b (i.e., the ID authentication is performed). Then, if the UID is stored in the user information database 22b, the user is identified (authenticated).

Moreover, in the authentication process of the case where image data is included as the user identification information in the authentication request, a user's face is extracted from the image data included in the authentication request, and it is determined whether or not the registered biometric information whose degree of matching with the extracted facial feature quantity is equal to or greater than a threshold value, is stored in the user information database 22b (i.e., the face authentication is performed). Then, such registered biometric information is stored in the user information database 22b, the user is identified.

Moreover, in the authentication process of the case where the biometric information (e.g., information indicating a feature quantity of fingerprints of the user) is included as the user identification information in the authentication request, and it is determined whether or not the registered biometric information whose degree of matching with the biometric information included in the authentication request is equal to or greater than a threshold value, is stored in the user information database 22b (i.e., the fingerprints authentication is performed). Then, such registered biometric information is stored in the user information database 22b, the user is identified.

The payment capability determination 232 acquires, from the user information database 22b, the information for settlement of the user identified by the authentication processing unit 231, and determines whether or not the user identified by the authentication processing unit 231 has a payment capability on the basis of the acquired information for settlement. For example, when the electronic money settlement is specified as the settlement method for the identified user, the user is determined to have the payment capability if the balance of the electronic value is equal to or higher than a predetermined price (predetermined amount). By this configuration, it is possible to reliably impose payment on the user in an amount equivalent to sales price of the product. Alternatively, when the direct debit settlement is specified as the settlement method for the identified user, the user is determined to have the payment capability if the balance of the deposit is equal to or higher than a predetermined price. Alternatively, when the point settlement is specified as the settlement method for the identified user, the user is determined to have the payment capability if the balance of points is converted at a predetermined conversion rate and the converted amount is equal to or higher than a predetermined price.

Alternatively, when the credit settlement is specified as the settlement method for the identified user, the user is determined to have the payment capability if the available amount is equal to or greater than a predetermined price. Alternatively, when the UID settlement is specified as the settlement method for the identified user, the user is determined to have the payment capability if the maximum amount is equal to or greater than a predetermined price. Incidentally, the predetermined price described above may be set to a minimum sales price (a unit price) of products that can be picked up from the storing chamber 12 of the vending machine 1 that is identified by the vending machine ID included in the authentication request, for example. The minimum sales price is acquired from the product information associated with the vending machine ID in the vending machine information database 22a.

The vending machine control unit 233 transmits the unlock command of the door 13 to the vending machine 1 when it is determined by the payment capability determination unit 232 that the user has the payment capability. That is, the vending machine control unit 233 controls to unlock the door 13 of the vending machine 1. Moreover, the vending machine control unit 233 transmits the lock command of the door 13 to the vending machine 1 when the closing of the door 13 of the vending machine 1 is detected.

That is, the vending machine control unit 233 controls to lock the door 13 of the vending machine 1.

When the closing of the door 13 is detected after the product picked up by the user from the storing chamber 12 is identified, the settlement processing unit 234 performs the settlement process for the product picked up on the basis of the information for settlement acquired by the payment capability determination 232. That is, the settlement processing of the product to be purchased by the user determined to have the payment capability is performed. Thus, the settlement process can be completed safely. In the settlement process for the product, a payment process for an amount corresponding to the sales price of the product (i.e., a process to require the user to pay for the amount) is performed in accordance with the settlement method that is included in the information for settlement of the user.

[2. Operation of Vending Machine Control System S]

Next, an operation of the vending machine control system S will be described.

(2.1 Processing of Vending Machine 1)

Figure 7:
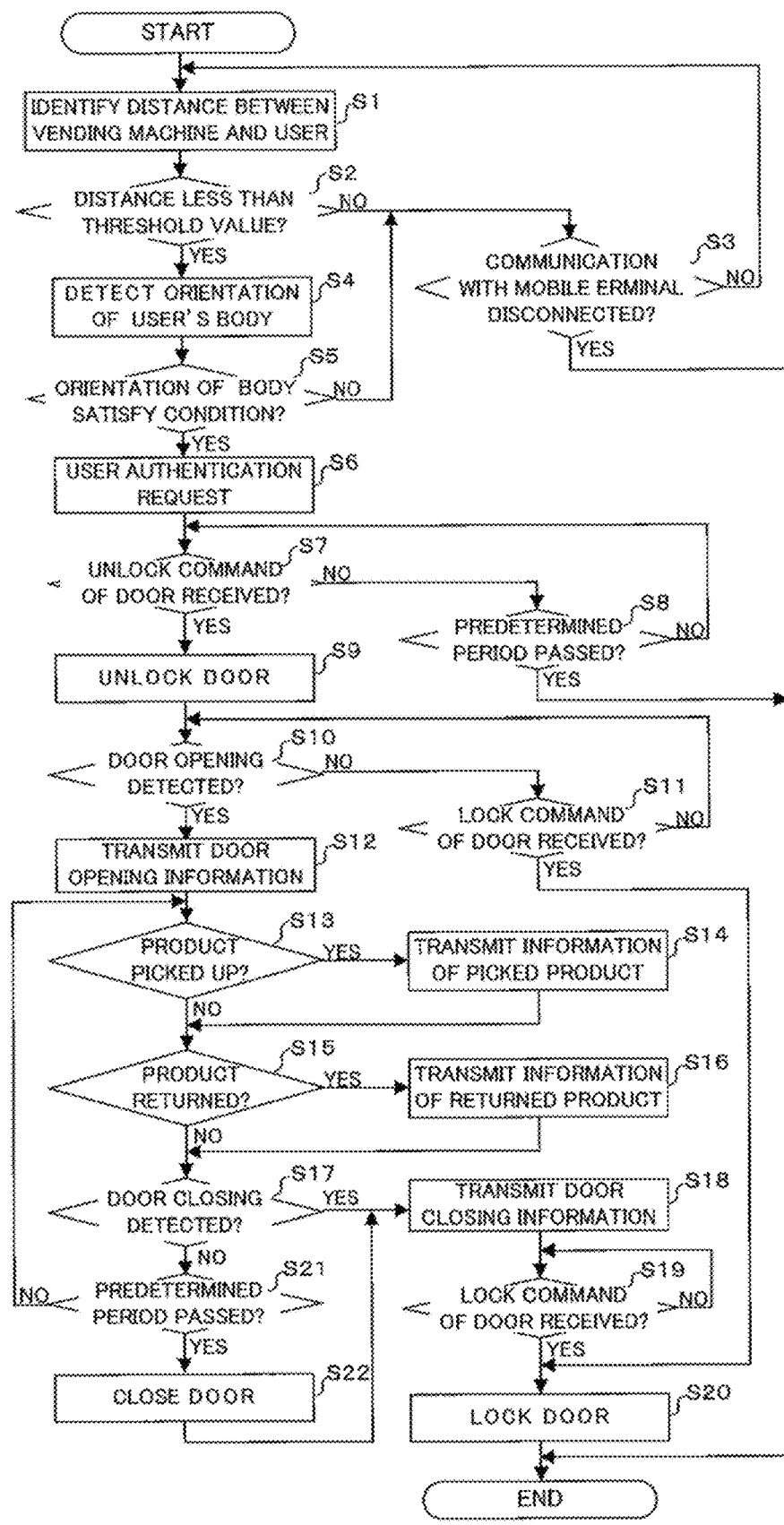
FIG. 7 is a flowchart illustrating an example of a process of the system control unit 19 in the vending machine 1.

First, a process of the system control unit 19 in the vending machine 1 will be described with reference to FIG. 7. FIG. 7 is a flowchart illustrating an example of a process of the system control unit 19 in the vending machine 1. For example, when a user possessing the mobile terminal 3 enters a vicinity range of the vending machine 1 (e.g., a range of several meters capable of a short-range wireless communication), the short-range wireless communication is established between the vending machine 1 and the mobile terminal 3, and the process illustrated in FIG. 7 is started. Incidentally, the process illustrated in FIG. 7 may be started when a person is detected from the image data input from the user detection sensor 18a.

When the process illustrated in FIG. 7 starts, the system control unit 19 (the user detection unit 191) identifies a distance between the vending machine 1 and the user (step S1). The distance between the vending machine 1 and the user is identified, for example, from the location information of the vending machine 1 and the location information of the mobile terminal 3. In this case, the system control unit 19 acquires the location information of the mobile terminal 3 by means of the short-range wireless communication established with the mobile terminal 3. At this time, the UID of the user of the mobile terminal 3 may be acquired along with the location information of the mobile terminal 3. Incidentally, as described above, the distance between the vending machine 1 and the user may be identified on the basis of the image data input from the user detection sensor 18a.

Next, the system control unit 19 (the user detection unit 191) determines whether or not the distance identified in step S1 is equal to or less than a threshold value (e.g., 50 cm) (step S2). If it is determined that the distance identified in step S1 is not equal to or less than the threshold (step S2: NO), the process proceeds to step S3. On the other hand, if it is determined that the distance identified in step S1 is equal to or less than the threshold value (step S2: YES), the process proceeds to step S4.

In step S3, the system control unit 19 (the user detection unit 191) determines whether or not the short-range wireless communication with the mobile terminal 3 has been disconnected. If it is determined that the short-range wireless communication with the mobile terminal 3 has not been disconnected (step S3: NO), the process returns to step S1. On the other hand, if it is determined that the short-range wireless communication with the mobile terminal 3 has been disconnected (step S3: YES), the process ends. Incidentally, in step S3, it may be determined whether or not a person is continuously detected from the image data input from the user detection sensor 18a. In this case, if the person is continuously detected from the image data, the process returns to step S1. On the other hand, if the person is no longer detected from the image data, the process ends.

In step S4, the system control unit 19 (the user detection unit 191) extracts the user's body on the basis of the image data input from the user detection sensor 18a, and detects the orientation of the extracted body. Incidentally, as described above, the user's sight line may be estimated on the basis of the input image data.

Next, the system control unit 19 (the user detection unit 191) determines that the orientation of the user's body (the user's sight line) detected in step S4 satisfies a predetermined condition (step S5). Here, the predetermined condition may be set as, for example, an angle range centered on the direction of the vending machine 1. If it is determined that the orientation of the user's body (or the user's sight line) satisfies the predetermined condition (step S5: YES), that is, if the user who is about to open the door 13 of the vending machine 1 is detected, the process proceeds to step S6. On the other hand, if it is determined that the orientation of the user's body (or the user's sight line) does not satisfy the predetermined condition (step S5: NO), the process returns to step S3.

In step S6, the system control unit 19 transmits an authentication request including the user identification information for identifying the detected user and the vending machine ID of the vending machine to the management server 2 via the communication network NW and waits for a response from the management server 2. At this time, the system control unit 19 activates a timer A1. The user identification information transmitted to the management server 2 includes the image data used to detect the user who is about to open the door 13, or the UID acquired (e.g., acquired along with the location information of the mobile terminal 3) from the mobile terminal 3 by the short-range wireless communication when detecting the user who is about to open the door 13. Incidentally, the authentication request including the user identification information and the vending machine ID may be transmitted from the mobile terminal 3 to the management server 2 via the communication network NW. In this case, the user identification information and the vending machine ID are transmitted from the vending machine 1 to the mobile terminal 3 via the short-range wireless communication.

Next, the system control unit 19 determines whether or not an unlock command of the door 13 has been received from the management server 2 (step S7). If the unlock command of the door 13 has not been received (step S7: NO), the process proceeds to step S8. On the other hand, if the unlock command of the door 13 has been received (step S7: YES), the process proceeds to step S9.

In step S8, the system control unit 19 determines whether or not a predetermined period of time has passed after the authentication request was transmitted. For example, when the time set by the timer A1 (e.g., few tens of seconds) counts up, it is determined that the predetermined period has passed (step S8: YES) and the process ends. That is, if it is determined by the management server 2 that the user was not identified or that the identified user did not have the payment capability, the door 13 is not unlocked. On the other hand, if it is determined that the predetermined period has not passed (step S8: NO), the process returns to step S7.

In step S9, the system control unit 19 (the lock/unlock control unit 194) controls to unlock the door 13 by outputting an unlock control signal to the lock/unlock mechanism.

Next, the system control unit 19 (the open/close detection unit 192) determines whether or not the opening of the door 13 has been detected (step S10). If the opening of the door 13 has not been detected (step S10: NO), the process proceeds to step S11. On the other hand, when the detected user opens the door 13 by operating the handle 13a provided on the door 13, the opening of the door 13 has been detected (step S10: YES), and the process proceeds to step S12. At this time, the system control unit 19 activates a timer A2.

In step S11, the system control unit 19 determines whether or not a lock command of the door 13 has been received from the management server 2. If the lock command of the door 13 has not been received (step S11: NO), the process returns to step S10. On the other hand, if the lock command of the door 13 has been received (step S11: YES), the process proceeds to step S20. In step S12, the system control unit 19 transmits the door opening information indicating the opening of the door 13 to the management server 2 via the communication network NW.

Next, the system control unit 19 determines whether or not a product has been picked up from the storing chamber 13 by the user (step S13). If it is determined that the product has been picked up from the storing chamber 13 (step S13: YES), the picked product is identified by the image recognition, and the product information of the identified product is transmitted to the management server 2 via the communication network NW (step S14). In this state, the system control unit 19 (the display control unit 196) displays the name, the sales price of the product identified (picked up), and the like on the display 15. On the other hand, if it is determined that the product has not been picked up from the storing chamber 13 (step S13: NO), the process proceeds to step S15.

In step S15, the system control unit 19 determines whether or not the product picked up by the user has been returned to the storing chamber 13. If it is determined that the picked product has been returned to the storing chamber 13 (step S15: YES), the returned product is identified by the image recognition, and the product information of the identified product is transmitted to the management server 2 via the communication network NW (step S16). In this state, the system control unit 19 deletes the name, the sales price of the product identified (returned), and the like from the display 15. On the other hand, if it is determined that the picked product has not been returned to the storing chamber 13 (step S15: NO), the process proceeds to step S17.

In step S17, the system control unit 19 (open/close detection unit 192) determines whether or not the closing of the door 12 has been detected. If it is determined that the closing of the door 12 has not been detected (step S17: NO), the process proceeds to step S21. On the other hand, the user confirms, on the display 15, the name, sales price of the product, and the like, that the user has picked up. Subsequently, when the user closes the door 12 to proceed to the settlement process for the product, the closing of the door 12 is detected (step S17: YES), the process proceeds to step S18.

In step S18, the system control unit 19 transmits the door closing information indicating the closing of the door 13 to the management server 2 via the communication network NW. Next, the system control unit 19 determines whether or not a lock command of the door 13 has been received from the management server 2. If the lock command of the door 13 has not been received (step S19: NO), the process returns to step S19. On the other hand, if the lock command of the door 13 has been received (step S19: YES), the process proceeds to step S20. In step S20, the system control unit 19 (the lock/unlock control unit 194) controls to lock the door 13 by outputting a lock control signal to the lock/unlock mechanism, and the process ends.

In step S21, the system control unit 19 determines whether or not a predetermined period of time has passed after the door 13 was opened. For example, when the time set by the timer A2 (e.g., a few minutes.) counts up, it is determined that the predetermined period has passed (i.e., the state in which the door 13 was opened continued for the predetermined period or longer) (step S21: YES), the process proceeds to step S22. On the other hand, it is determined that the predetermined period has not passed (step S21: NO), the process returns to step S13.

In step S22, the system control unit 19 (the door drive control unit 195) controls to close the door 13 by outputting a close control signal to the door drive mechanism 14. That is, the control is performed to prevent the product from being picked up from the storing chamber 12 of the vending machine 1. Thereafter, the process shifts to step S18, and the door closing information indicating the closing of the door 13 is transmitted to the management server 2.

(2.2 Processing of Management Server 2)

Figure 8:
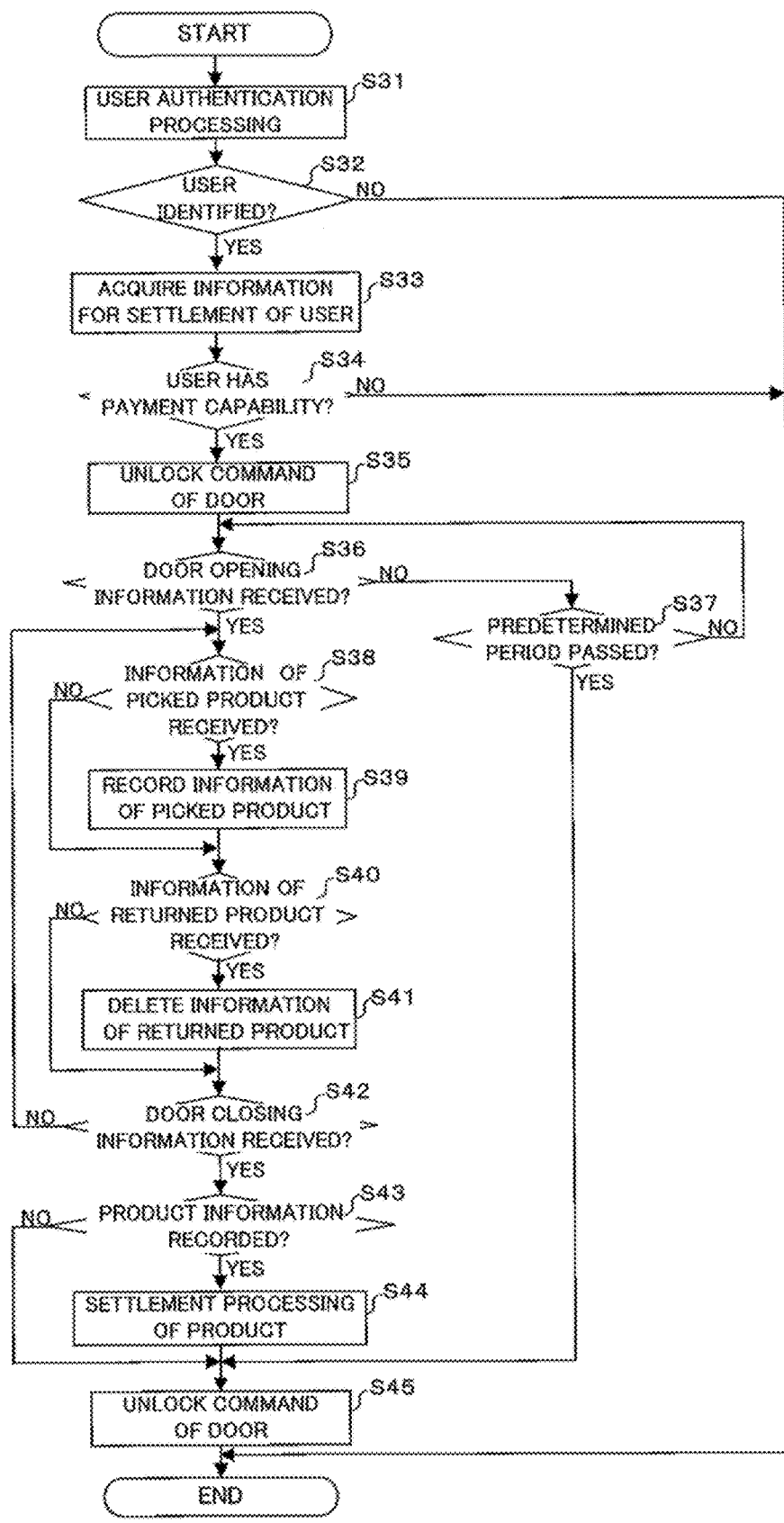
FIG. 8 is a flowchart illustrating an example of a process of the system control unit 23 in the management server 2.

Next, a process of the system control unit 23 in the management server 2 will be described with reference to FIG. 8. FIG. 8 is a flowchart illustrating an example of a process of the system control unit 23 in the management server 2. The process illustrated in FIG. 8 is started when the authentication request from the vending machine 1 is received through the communication unit 21.

When the process illustrated in FIG. 8 starts, the system control unit 23 (the authentication processing unit 231) performs the authentication process for the user who is about to open the door 13 of the vending machine 1 (step S31). In the authentication process, as described above, the ID authentication or the biometric authentication is performed. Next, the system control section 23 (the authentication processing section 231) of the management server 2 determines whether or not the user has been identified by the authentication processing of step S31 (step S32). If the user has been identified (step S32: YES), the process proceeds to step S33. On the other hand, if the user has not been identified (step S32: NO), the process ends.

In step S33, the system control unit 23 (the payment capability determination unit 232) acquires the information for settlement of the user identified in step S32 from the user information database 22b. Next, the system control unit 23 (the payment capability determination unit 232) determines whether or not the user identified in step S32 has a payment capability on the basis of the information for settlement acquired in step S33 (step S34). If it is determined that the user has the payment capability (step S34: YES), the process proceeds to step S35. On the other hand, if it is determined that the user does not have the payment capability (step S34: NO), the process ends.

In step S35, the system control unit 23 (the vending machine control unit 234) transmits the unlock command to the vending machine 1 via the communication network NW and waits for a response from the vending machine 1. At this time, the system control unit 23 activates timer A3. The unlock command thus transmitted is received in step S7 of above process of the vending machine 1. Accordingly, the vending machine control unit 234 causes the door 13 of the vending machine 1 to be unlocked.

Next, the system control unit 23 determines whether or not the door opening information has been received from the vending machine 1 (i.e., whether the opening of the door 13 has been detected) (step S36). If the door opening information has not been received (step S36: NO), the process proceeds to step S37. On the other hand, if the door opening information has been received (step S36: YES), the process proceeds to step S38.

In step S37, the system control unit 23 determines whether or not a predetermined period of time has passed after the unlock command was transmitted. For example, when the time set by the timer A3 (e.g., few tens of seconds) counts up, it is determined that the predetermined period has passed (step S37: YES) and the process proceeds to step S45. On the other hand, if it is determined that the predetermined period has not passed (step S37: NO), the process returns to step S36.

In step S38, the system control unit 23 determines whether or not the product information of the product picked up from the storing chamber 12 has been received from the vending machine 1. If the product information of the picked product has not been received (step S38: NO), the process proceeds to step S40. On the other hand, if the product information of the picked product has been received (step S38: YES), the product information of the picked product is recorded (step S39), and the process proceeds to step S40. Here, recording the product information means, for example, that the product information is recorded (registered) in a list of products to be settled.

In step S40, the system control unit 23 determines whether or not the product information of the product returned to the storing chamber 12 has been received from the vending machine 1. If the product information of the returned product has not been received (step S40: NO), the process proceeds to step S42. On the other hand, if the product information of the returned product has been received (step S40: YES), the product information of the returned product is deleted (e.g., erased from the above list) (step S41), and the process proceeds to step S42.

In step S42, the system control unit 23 determines whether or not the door closing information has been received from the vending machine 1 (i.e., whether the closing of the door 13 has been detected). If the door closing information has not been received (step S42: NO), the process proceeds to step S38. On the other hand, if the door closing information has been received (step S43: YES), the process proceeds to step S43.

In step S43, the system control unit 23 determines whether or not the product information has been recorded (e.g., recorded in the above list). If it is determined that the product information has been recorded (step S43: YES), the process proceeds to step S44. On the other hand, if it is determined that the product information has not been recorded (step S43: NO), the process proceeds to step S45.

In step S44, the system control unit 23 (the settlement processing unit 234) performs the settlement processing of the picked product on the basis of the information for settlement acquired in step S33 and the above-recorded product information. By means of the settlement processing, payment of an amount equivalent to the sales price of the product is imposed on the above-identified user, and the process proceeds to step S45.

In step S45, the system control unit 23 (the vending machine control unit 234) transmits the lock command to the vending machine 1 via the communication network NW and the process ends. The lock command thus transmitted is received in step S19 of above process of the vending machine 1. Accordingly, the vending machine control unit 234 causes the door 13 of the vending machine 1 to be locked.

As has been described, according to the foregoing embodiment, when the vending machine control system S detects a user who is about to open the door 13 of the vending machine 1 while the door 13 is locked, the vending machine control system S determines whether the detected user has a payment capability on the basis of the information for settlement of the detected user. And then, the vending machine control system S controls to unlock the door 13 of the vending machine 1 in a case that it is determined that the user has the payment capability. Thus, it is possible to improve convenience of the vending machine 1 and prevent a user who does not have payment capability from picking up a product from the vending machine.

In the foregoing embodiment, as an example of preventing any of the products from being picked up from the storing chamber 12, the door drive control unit 195 and the door drive mechanism 14 are configured to control to automatically close the door 12. However, the embodiment may be not limited to this configuration. For example, the vending machine 1 may be configured to include a product removal prevention mechanism provided on the shelf 12a of the storing chamber 12 or include an inner door provided between the storing chamber 12 and the door 13, so as to prevent any of the products from being picked up. FIG. 9 is an external perspective view of the vending machine 1 that includes an inner door 13b provided between the storing chamber 12 and the door 13. In the example of FIG. 9, the vending machine 1 further includes an inner door drive mechanism (not illustrated) provided to drive the inner door 13b (e.g., a shutter). In this case, the door drive control unit 195 of the vending machine 1 controls to automatically close the middle door 13b by outputting a close control signal to the middle door drive mechanism when the door 13 has been opened for a predetermined time or longer. For example, the inner door 13b placed in an upper part of the vending machine 1 is lowered in a downward direction (in an arrow direction) of the vending machine 1 by the inner door drive mechanism. According to this configuration, it is possible to prevent the third party from removing any of the products from the storing chamber 12 even in a case that the door 12 of the vending machine 1 cannot be closed for some reason.

Incidentally, it should be noted that the foregoing embodiment is one embodiment of the present invention and does not limit the present invention accordingly; and any change, addition, or modification of the foregoing embodiment appropriately made within the spirit of the present invention will naturally fall within the technical scope of the present invention. For example, in the above embodiment, the example in which the user who possesses the mobile terminal 3 is detected and identified (authenticated) has been described, but the present invention may be applied even when the user does not possess the mobile terminal 3. (That is, the user can be detected and identified based on image data and biometric information).

Moreover, although the management server 2 is configured to perform the settlement processing of the product, the vending machine 1 may be configured to perform the settlement processing of the product instead. In this case, the system control unit 19 acquires the information for settlement of the detected user from the management server 2 via the communication network NW, and determines whether or not the user has a payment capability on the basis of the information for settlement. If it is determined that the user has the payment capability, the system control unit 19 controls to unlock the door 13, and performs the settlement processing of the product picked up from the storing chamber 12. Moreover, in the above embodiment, the vending machine 1 is configured to detect the user who is about to open the door 13, but instead, the management server 2 may be configured to detect the user who is about to open the door 13. In this case, the system control unit 23 acquires, from the vending machine 1, information (e.g., including the location information of the mobile terminal 3, the image data or the biometric information acquired by the user detection sensor 18a, etc.) necessary for detecting the user, and detects the user who is about to open the door 13 of the vending machine 1 by the first detection method or the second detection method described above on the basis of the acquired information.

REFERENCE SIGNS LIST

1 Vending machine
2 Management server
3 Mobile terminal
11 Main body
12 Door
13 Storing chamber
14 Door drive mechanism
15 Display
16 Communication unit
17 Storage unit
18 Sensor unit
19 System control unit
21 Communication unit
22 Storage unit
23 System control unit
191 User detection unit
192 Open/close detection unit
193 Product identification unit
194 Lock/unlock control unit
195 Door drive control unit
196 Display control unit
231 Authentication processing unit
232 Payment capability determination unit
233 Vending machine control unit
234 Settlement processing unit
S Vending machine control system
NW Network

The invention claimed is:

1. A vending machine control system comprising:
at least one memory configured to store program code; and at least one processor configured to access the program code and operate as instructed by the program code,
wherein the program code comprises:
detection code configured to cause the at least one processor to detect a user within a predetermined distance from a door of a vending machine when the door is in a locked state;
orientation determination code configured to cause the at least one processor to determine whether the user's body is facing toward the door;
acquisition code configured to cause the at least one processor to acquire information confirming the user's ability to settle a purchase of a product from the vending machine;
determination code configured to cause the at least one processor to determine, based on the acquired purchase settlement information, whether the user has a payment capability; and
first control code configured to cause the at least one processor to cause the door to change to an unlocked state based on detecting that the user is within the predetermined distance, determining that the user has the payment capability, and determining that the user's body is facing toward the door.

2. The vending machine control system of claim 1, wherein the detection code causes the at least one processor to identify the user based on biometric information acquired by a sensor attached to the door.

3. The vending machine control system of claim 1,
wherein the purchase settlement information comprises information reflecting a method of payment owned by the user, and
wherein the determination code is further configured to cause the at least one processor to identify a predetermined price threshold the user might pay based on the contents of the vending machine and to determine whether the payment capability is sufficient to meet the predetermined price threshold.

4. The vending machine control system of claim 1,
wherein the program code further comprises:
product identification code configured to cause the at least one processor to identify a product picked up through an open space of the vending machine by the user after the door is opened; and
settlement processing code configured to cause the at least one processor to perform, based on the acquired purchase settlement information and detecting that the door is closed after the product is identified, a settlement process for the identified product.

5. The vending machine control system of claim 1,
wherein the program code further comprises:
second control code configured to cause the at least one processor to prevent the product from being removed from the vending machine based on detecting that the door remains open for a period of time greater than or equal to a predetermined period of time.

6. A control method executed by at least one processor, the control method comprising:
detecting a user within a predetermined distance from a door of a vending machine when the door is in a locked state;
determining whether the detected user's body is facing toward the door;
acquiring information confirming the user's ability to settle a purchase of a product from the vending machine;
determining, based on the acquired purchase settlement information, whether the user has a payment capability; and
controlling the door to change to an unlocked state based on detecting that the user is within the predetermined distance from the door of the vending machine, determining that the user has the payment capability, and determining that the user's body is facing toward the door.

7. A non-transitory computer readable medium having instructions stored therein, which when executed by at least one processor cause the at least one processor to execute a method of controlling a vending machine, the method comprising:
detecting a user within a predetermined distance from a door of a vending machine when the door is in a locked state;
determining whether the detected user's body is facing toward the door;
acquiring information confirming the user's ability to settle a purchase of a product from the vending machine;

determining, based on the acquired purchase settlement information, whether the user has a payment capability; and controlling the door to change to an unlocked state based on detecting that the user is within the predetermined distance from the door of the vending machine, determining that the user has the payment capability, and determining that the user's body is facing toward the door.

\* \* \* \* \*